INVENTORS.
HENRY LEVESON PODMORE
DENIS FAHEY

Aug. 6, 1963  H. L. PODMORE ETAL  3,100,088
VIBRATION MILLS

Filed Oct. 20, 1961  4 Sheets-Sheet 2

INVENTORS.
HENRY LEVESON PODMORE
DENIS FAHEY

INVENTORS.
HENRY LEVESON PODMORE
DENIS FAHEY

United States Patent Office 3,100,088
Patented Aug. 6, 1963

3,100,088
VIBRATION MILLS
Henry Leveson Podmore, Wildacres, Consal, near Wetleyrocks, and Denis Fahey, Stoke-on-Trent, England, assignors to W. Podmore and Sons Limited and William Boulton Limited, jointly
Filed Oct. 20, 1961, Ser. No. 146,563
Claims priority, application Great Britain Nov. 19, 1960
11 Claims. (Cl. 241—170)

This invention relates to vibration mills, more particularly to grinding and deburring mills utilizing vibrational energy. Included in the objects of this invention are:

First, to provide a vibration mill which employs an annular chamber, a means for suspension, and a vibrational, energy-imparting means so arranged that the mixture of product and media represented by the material being ground or workpieces being deburred and the grinding or deburring media and deburring compounds, as the case may be, is effectively maintained in a fluid or mobile state with the smaller components of the mixture being dispersed between the larger components while the mixture is subjected to impulses of sufficient magnitude and frequency to insure efficient grinding or deburring operations.

Second, to provide a vibration mill wherein the chamber and its contents are subjected to a gyrating vibrational action about a vertical axis producing a complex of vertical, radial, and tangential impulse components, the force of the impulse components exceeding the effect of the force of gravity on the contents of the mill, and producing resultant impulses which are systematically applied in all directions to the contents of the mill so as to effect uniform dispersion of the smaller components of the mixture between the larger components for impact thereby; the resultant impulses being so oriented and relatively timed as to cause both circumferential precession of the mixture and rotation of the mixture in essentially radiating vertical planes.

Third, to provide a vibration mill wherein the intensities, amplitudes, and frequencies of the impulse components produced may be adjusted, preselected, or varied, one in relation to the others, so as to meet the conditions dictated by the size of the mill, the characteristics of the material to be ground, or the workpieces to be deburred.

Fourth, to provide a vibration mill wherein the vibrations are so imparted that the vertical impulse components at one side thereof are of opposite phase to the vertical impulse components at the diametrically opposite side thereof, whereby virtually all the energy is absorbed in the mill with a minimum percent being transmitted to supporting structures, thereby not only minimizing the power requirements but also simplifying installation of the mill.

Fifth, to provide a vibration mill wherein the bottom of the chamber may have at least one helical ramp terminating in a step, and the mixture of media and product may be caused to precess up the ramp and cascade over the step to effect periodic gross redistribution of succeeding portions of the mixture.

Sixth, to provide a vibration mill wherein the bottom of the chamber is semitoroidal to aid in rotation of its contents about a toroidal path.

With the above and other objects in view, as may appear hereinafter, reference is directed to the accompanying drawings in which.

Figure 1:
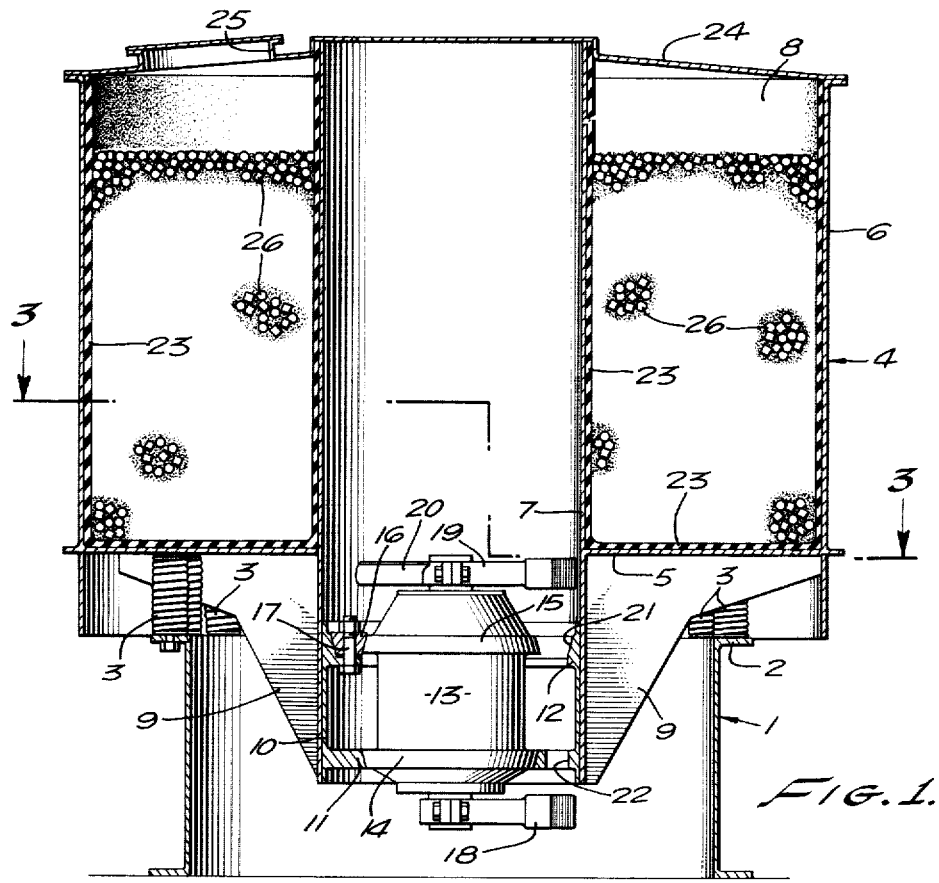
FIGURE 1 is a longitudinal sectional view taken through 1—1 of FIGURE 3 showing one form of the vibration mill.
Figure 3:
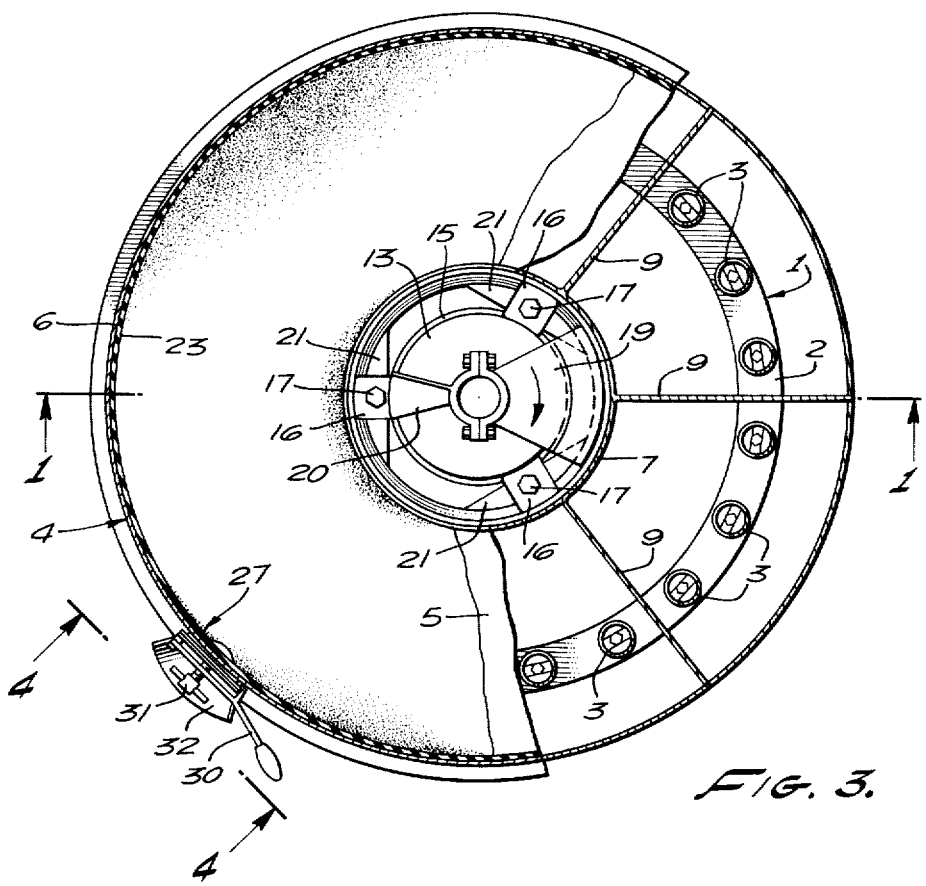
FIGURE 3 is a transverse sectional view of a vibration mill shown in FIGURE 1, the view being taken substantially through 3—3 of FIGURE 1.

Reference is first directed to the vibration mill illustrated particularly in FIGURES 1 and 3. The vibration mill here illustrated includes a cylindrical base frame 1 having a flange 2 at its upper extremity which supports a ring of coil springs 3.

Yieldably supported on the coil springs 3 is a cylindrical container 4 having a bottom wall 5, a radially outer wall 6, and a central tube 7, forming a radially inner wall so as to define an annular operating chamber 8.

The central tube 7 projects below the bottom wall 5 of the container 4. Radiating reinforcing ribs 9 join the downwardly extending portion of the central tube 7 with the bottom wall 5 so as to form with the container 4 a unitary rigid structure.

Welded or otherwise secured within the central tube 7 is a sleeve 10 having internally a lower motor mounting ring 11 and an upper motor mounting ring 12. A motor 13 having a lower flange 14 and an upper flange 15 is adapted to be supported within the mounting rings 11 and 12. The lower mounting ring 11 and lower flange 14 are provided with mating tapered surfaces, whereas the upper mounting ring 12 is adapted to receive retainer wedges 16 interposed between the upper mounting ring 12 and the upper flange 15. The retainer wedges 16 are held in place by bolts 17.

The motor 13 is provided with a shaft which projects from the lower and upper ends thereof. The protruding ends of the motor shaft receive a lower eccentric weight 18 and an upper eccentric weight 19. The weights 18 and 19 are adapted to be adjusted circumferentially with respect to each other for purposes which will be brought out hereinatfer.

The upper eccentric weight 19 may incorporate a fan blade 20, and openings 21 and 22 may be provided in the lower and upper motor mounting rings 11 and 12 so that air may circulate upwardly past the motor 13 and continue upwardly through the central tube 7.

The central tube 7, bottom wall 5, and radially outer wall 6 forming the walls of the operating chamber 8 are preferably covered with a liner 23 formed of rubber or other elastomer. The annular upper end of the operating chamber 8 is provided with a cover 24 which may be provided with an inlet or inspection opening 25.

As will be brought out in more detail hereinafter, the operating chamber 8 is substantially filled with a grinding or deburring medium 26, which may take various forms depending upon the character of the particular grinding or deburring operation intended to be performed by the mill.

Figure 2:
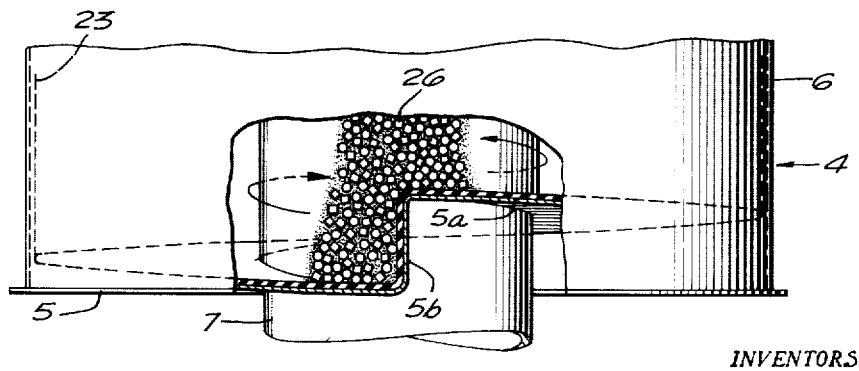
FIGURE 2 is a fragmentary, partial elevational, partial sectional view showing a modified form of the vibration mill.

Reference is directed to FIGURE 2 of the drawings. The construction here illustrated is essentially the same as that shown in FIGURES 1 and 3 except that the bottom wall 5 is modified to form one or more helical ramps 5a. In the illustration one helical ramp is shown which terminates in a step 5b. Operation of the structure shown in FIGURE 2 will be described more particularly hereinafter.

Figure 4:
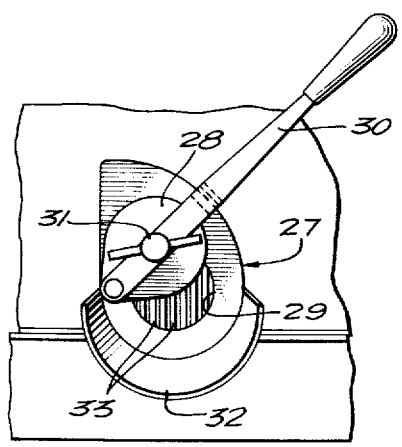
FIGURE 4 is an enlarged, fragmentary, elevational view taken from the plane 4—4 of FIGURE 3, illustrating the drain valve.

Reference is now directed particularly to FIGURES 3 and 4, which illustrate a discharge valve 27. The discharge valve may be the type which utilizes a valve plate 28 pivoted at one side of the valve opening 29. The valve plate may be mounted on the same axis as a handle lever 30, and is provided with a screw member 31 so that it may be tightened over the valve opening 29. When the screw member 31 is released, the handle lever 30 may move the valve plate between its open and closed positions. When the valve plate is in its closed position, the screw member 31 may be tightened to seal the opening 29. A discharge spout 32 may be located under the discharge valve 27. If the mill is intended to be used for grinding purposes, the discharge valve may have a retainer grid 33 to retain the grinding medium 26 within the operating chamber 8 while the material which has been ground is discharged therefrom.

Figure 6:
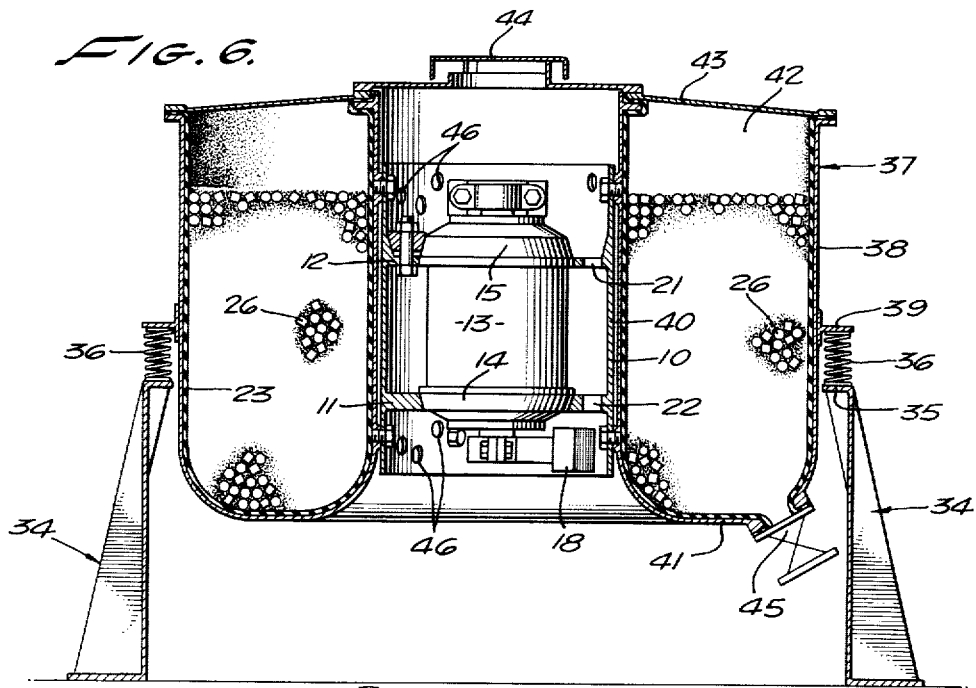
FIGURE 6 is a vertical, sectional view similar to FIGURE 1 showing a further modified form of the vibration mill.

Reference is now directed to FIGURE 6. This construction is similar to the first described structure except that the mounting springs are located between the top and bottom of the container and the motor unit is also located between the top and bottom of the container within its central tube. More particularly the construction shown in FIGURE 6 includes a base frame 34 having a supporting flange 35 on which is supported a ring of coil springs 36. A container 37 is suspended within the ring of springs 36. The container includes an outer wall 38 which is provided between its upper and lower ends with a mounting flange 39 adapted to rest on the springs 36 and be suitably secured thereto by means not shown. The container 37 also includes an inner wall 40 forming a central tube corresponding to the central tube 7 of the first described structure. The inner and outer walls 38 and 40 are connected by a bottom wall 41 which is preferably curved and semitoroidal in cross section. The container 37 defines an annular operating chamber 42 corresponding to the operating chamber 8 of the first described structure. The operating chamber 42 is closed by an annular cover 43 and in this construction the tube formed by the inner wall 40 is provided with a cover 44, preferably so arranged as to permit the flow of air through the tube or within the inner wall 40. In this construction a discharge valve 45 is indicated diagrammatically.

The tube defined by the inner wall 40 receives a motor and eccentric weight unit similar to that shown in the first described structure. In this instance the sleeve 10 of the motor and eccentric weight unit is shown as being secured by bolts and provided with axially-spaced mounting holes 46 so that the motor and eccentric weight unit may be vertically adjusted with respect to the container 37.

Figure 7:
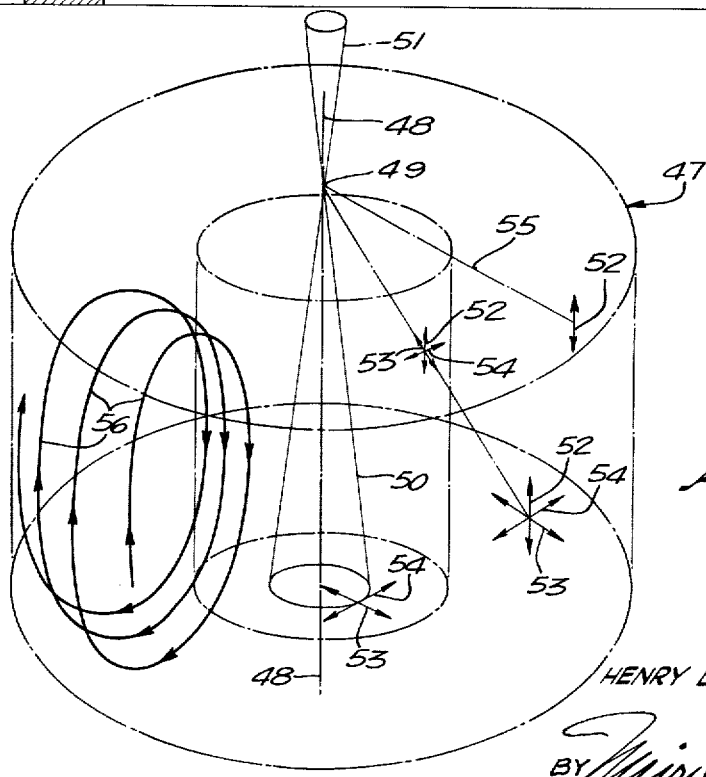
FIGURE 7 is a diagrammatical view illustrating the nature of the vibrations produced in the mill.

Although the vibration mill constructions shown and described have different characteristics, they operate similarly. In both cases the gyratory movement of the operating chamber produces a complex but systematic array of impulses applied in all directions to the mixture within the chamber. The nature of the gyratory movement and the impulses produced are idealized in FIGURE 7, which represents diagrammatically an operating chamber 47 corresponding to the operating chamber 8 or 42.

When the operating chamber is at rest, it defines a vertical axis. For purposes of initial consideration, the lower and upper weights 18 and 19 are assumed to be in vertical alignment; that is, a condition of "zero" lead. Under this condition rotation of the eccentric weights causes the normally vertical axis 48 to gyrate about a null point 49 on the vertical axis, so that the normally vertical axis describes two opposed essentially conical figures 50 and 51 having apices coinciding with the null point 49.

Due, possibly, to the fact that the operating chamber need not be accurately balanced, and the supporting springs are not exactly uniform, the null point 49 is not a mathematical point, but may be considered as in a small region around such a point. The null point or region 49 may be below or above the level of the mixture within the operating chamber and its location is influenced by the position of the center of gravity of the container and its contents with respect to the location of the supporing springs, as well as the vertical position of the eccentric weights.

The gyrating movement produces impulses which may be divided into a vertical impulse component 52, a radial impulse component 53, and a tangential impulse component 54. The relative magnitudes of the impulse components, and the direction of the resultant impulses differ with different locations within the operating chamber.

For example, assume locations equidistant from the null point 49; that is, location on an imaginary sphere, the center of which coincides with the null point. Then the impulse components in the region of a horizontal plane 55 through the null point 49 will consist of essentially the vertical impulse component 52. The impulse components in the region of the vertical axis comprise essentially the radial impulse component 53 and tangential component 54. This condition does not, of course, exist within the grinding chambers 8 of FIGURE 1, or 42 of FIGURE 5, because of the central tubes 7 or 40, respectively. Between the two extremes, all three impulse components contribute in varying degree to the resulting impulses and determine their direction.

The magnitudes of all three impulse components increase with distance from the null point 49. Also, the impulse components are not in phase; that is, in the region offset from the horizontal plane 55, the vertical and tangential impulse components 52 and 54 are 90° out-of-phase, and in the region of the vertical axis, the radial and tangential impulse components 53 and 54 are also 90° out-of-phase.

Still further, vertical impulse components at diametrically opposite sides of the operating chamber are 180° out-of-phase. More specifically, the upward impulse at one side of the mill is balanced, to a large extent, by the downward impulse at the opposite side. The expanding springs at the upwardly moving side of the mill supply the energy which is largely absorbed by the contracting springs at the opposite side. As a result the energy imparted to the mill is utilized in a highly efficient manner. This is demonstrated by the fact that so little energy is transmitted to the base structure, the mill may be operated without being bolted to the floor; or in any case it does not require a foundation of greater strength than that needed to support the dead weight of the mill and its contents.

The radial impulse components 53 at diametrically opposite sides of the operating chamber are likewise 180° out-of-phase; that is, when the impulse at one side is in a radially outward direction, the radial impulse component at the opposite side is in a radially inward direction. This tends, especially as the vertical distance from the null point increases, to produce a back-and-forth movement which is believed to play an important part in grinding operations.

The tangential impulse components 54 at diametrically opposite sides are also 180° out-of-phase; that is, while the absolute direction of movement is the same at both sides, the movement with respect to the circumference of the operating chamber is clockwise on one side and simultaneously counterclockwise on the opposite side.

It is believed that, by reason of the fact that the resultant impulses act on the mixture from all directions with different magnitudes and phase relationships, there is produced an impulse complex or impulse array which results in a particularly effective interaction between the grinding or deburring media, or deburring media plus deburring compounds, and the material to be ground or the workpieces to be deburred.

In the foregoing analysis of the operation of the mill, the eccentric weights have been considered as being in vertical coincidence; that is, as being in a condition of "zero" lead. If the lower weight is advanced or retarded relative to the upper weight in respect to the direction of the motor shaft rotation, the relative magnitudes of the impulse components may be varied to meet particular operating conditions. For example, such adjustment of the relative angular positions of the eccentric weights has the tendency to control "precession" of the mixture in the operating chamber; that is, to cause a mass rotation of the mixture in either a clockwise or counterclockwise direction.

There is also a tendency for the mixture to rotate in a vertical radiating plane; that is, to produce a toroidal rotation. This tendency is apparently due to the greater magnitude of the resultant impulses at the radially outer portion of the operating chamber and is apparently enhanced by the curved bottom shown in FIGURE 6. More particularly, the mixture tends to move upwardly adjacent the radially outer wall, then radially inwardly across the top, then downwardly at the radially inner wall, then radially outwardly across the bottom. When the precession movement is superposed, the mixture spirals about the operating chamber as represented by the helical line 56 in FIGURE 7.

Under some conditions, more complex mass movement of the mixture may be produced. For example, conditions have been observed in which the material in the operating chamber moved downwardly adjacent both the radially inner and radially outer walls and upwardly midway between these walls. This type of movement seems to be more readily achieved if the bottom of the operating chamber is semitoroidal.

Vertical change in the relative location of the center of gravity of the operating chamber and contents and the plane of support on the springs, vertical change in position of the motor and weights, change in the total as well as the relative mass of the weights, all introduce changes in the relative magnitudes of the vertical, radial, and tangential impulse components and thus change the action of the mill. A further and most important variable is the motor speed, by which the frequency of all impulses may be increased or decreased. By reason of wide selection of operating factors, the mill may be tailored to meet specific operating conditions. Thus if used as a grinding mill, a grinding action most effective for a particular material, or fineness of the final product, may be selected. This is equally true if the mill be used as a deburring mill.

The complex nature of the impulses produced may be appreciated by observation of small spots on the external surface and top of the container. Such spots appear to move in circles, ellipses, or distortions thereof when viewed along an axis normal to the plane of movement. When viewed in the plane of movement, the spots appear as lines or approximations thereof, either straight or curved, or even as figure 8's in some instances.

When the eccentric weights have "zero" lead, the axes normal to the planes of movement appear to focus on the region adjacent the null point; however, when the lower weight is angularly displaced these axes, when viewed from above, appear to be tangent to a ring in or adjacent to the horizontal plane 55.

Under the condition of "zero" lead, the mixture usually may precess slowly in either direction with respect to the direction of rotation of the motor. Under conditions wherein the planes of the eccentric weights are arcuately displaced to produce an arbitrary "positive" or "negative" lead, the mixture may be caused to precess in a selected direction. Under such conditions the planes of rotation of the spots change their orientation, sometimes in a complex manner. This complex though orderly variation in the apparent movement of spots on the container is indicative of the nature of the impulses which are applied to the contents of the container.

The mixture of media and product, whether comprising grinding media and material to be ground, or deburring media with or without deburring compounds and workpieces, and whether in a dry state or including a liquid, must be maintained in a fluid or mobile state so that the finer particles may move between the larger particles for interaction. It is therefore essential that the kinetic energy imparted to the eccentric weights be such that the resulting acceleration imparted by the walls of the operating chamber and between the particles be above a threshold value.

The mixture at rest in the operating chamber is subjected to the force of gravity which is applied directly to the bottom of the operating chamber and indirectly, due to interaction between the ingredients of the mixture, against the walls of the chamber. It appears that the force of the impulses applied must be at least greater than the effect of gravity, such that as the bottom or side walls recede from the mixture they accelerate sufficiently faster than the mixture under influence of gravity so that during gyration various portions of the mixture are momentarily free of the bottom and walls of the operating chamber.

In practice the impulses applied by the walls and bottom of the operating chamber, as well as the impulses between the larger particles, may have forces exceeding the force of gravity by several times. However, the distance through which these impulses are applied is relatively small. That is, the ingredients of the mixture are not thrown violently across or out of the container, should the cover be removed, except that some splashing may occur. The nature of the vibrations imparted may be further demonstrated by the fact that one may insert his hand with safety in the vibrating mixture. When this is done, it will be observed that it is comparatively easy to force one's hand or an implement into the vibrating mixture; whereas, when the mill is at rest, this cannot readily be done.

In the application of the mill to grinding operations, it has been established that the force required to reduce the size of a particle by impact decreases with the volume of the particle. However, as the particles decrease in size their number increases rapidly; therefore, proportionately more impacts and greater effective grinding surface are required to maintain a constant rate of size reduction. In other words, if a relatively coarse-ground product is desired, relatively large media may be used, and a relatively slow vibration of greater amplitude may be employed; if a finely ground product is desired, relatively small media (with attendant greater effective grinding surface), faster vibration, and lower amplitude are preferred.

Rotational speeds of the eccentric weights from 900 to 4000 r.p.m. are feasible, depending on the size of the mill and the character of the work to be done. Similarly, amplitudes of vibration of the mixture ranging from less than ⅛" to ½" are feasible. The grinding medium is, preferably, cylindrical in form; however, spherical grinding meadia or grinding media of other shapes may be used. For most purposes, a hard ceramic grinding medium is preferred. Grinding media ranging in size from 2" to ⅛" in major dimension are feasible, depending upon the initial size of the material to be ground and the desired final size of the product. It is possible with small grinding media and high frequency operation to grind efficiently a product to an average particle size of less than a micron, and have a product in which the particles are remarkably uniform.

By way of example, but not of limitation, the following is a description of a particular mill used as a grinding mill and the results of a test run thereon:

Mill chamber dimension_ 54" high, 80" dia.
Center tube_____ 22".
Height of mixture_____ 42".
Weight of grinding media_ 14,000 pounds.
Dimension of grinding
 media_____ Cylinders ½" dia. x ½" long.
Motor rating_____ 8 H.P., 1120 r.p.m.
Charge:
 Zirconium silicate___ 1750 pounds.
 Water_____ 1168 pounds.

| Time, hours | Particle size,[1] microns | | | Surface[2] area, cm.²/gm. | Power, kw.-hr. ton |
|---|---|---|---|---|---|
| | Max. | Min. | Avg. | | |
| Start | | | 125 | | |
| 5 | 170 | 1 | 70 | 2,668 | 57 |
| 10 | 75 | | 25 | 9,844 | 132 |
| 15 | 30 | | 12 | 16,008 | 212 |
| 20 | 20 | | 10 | 19,136 | 292 |
| 25 | 17 | | 8 | 22,080 | 374 |
| 30 | 12 | | 5 | 23,276 | 456 |
| 33 | 8 | | 3 | 24,932 | 508 |
| 36 | 7 | | 3 | 25,944 | 558 |
| 39 | 5 | | 2 | 27,140 | 608 |

[1] As measured microscopically.
[2] Absorptiometer reading.

In deburring operations, the medium is usually, but not necessarily, smaller than the workpieces. Mixtures of different grinding media, or grinding media coupled with various compounds, may be used. In this regard, the term "deburring operation" is intended to include burnishing and polishing operations. The grinding or deburring operations may be performed wet or dry, depending on the character of the product.

The various factors which make possible a tailoring of the mill operation to particular grinding or deburring operations, so as to produce optimum results, may be summed up as follows (but not necessarily in the order of importance):

(1) Rotational speed of the motor and eccentric weights.
(2) Total mass of the eccentric weights.
(3) Relative mass of the eccentric weights.
(4) Vertical distances of any of the following elements with respect to the others:
　(a) Top motor weight.
　(b) Bottom motor weight.
　(c) Center of mass of the entire vibrating structure including the container and its contents.
　(d) Spring-supporting flange.
(5) Relative diameters of spring-supporting flange and container.
(6) Physical characteristics of the supporting spring.

With regard to FIGURE 2, the helical ramp and step are utilized when the nature of the product indicates that a periodic gross mixing of media and product is desired. The mill is adjusted so that the mixture precesses up the ramp and cascades over the step. As the mixture progressively cascades over the step, gross mixing is effected. However, in many instances adjustment or preselection of the impulses which increase mass rotation of the mixture in radial planes is sufficient for this purpose.

Figure 5:
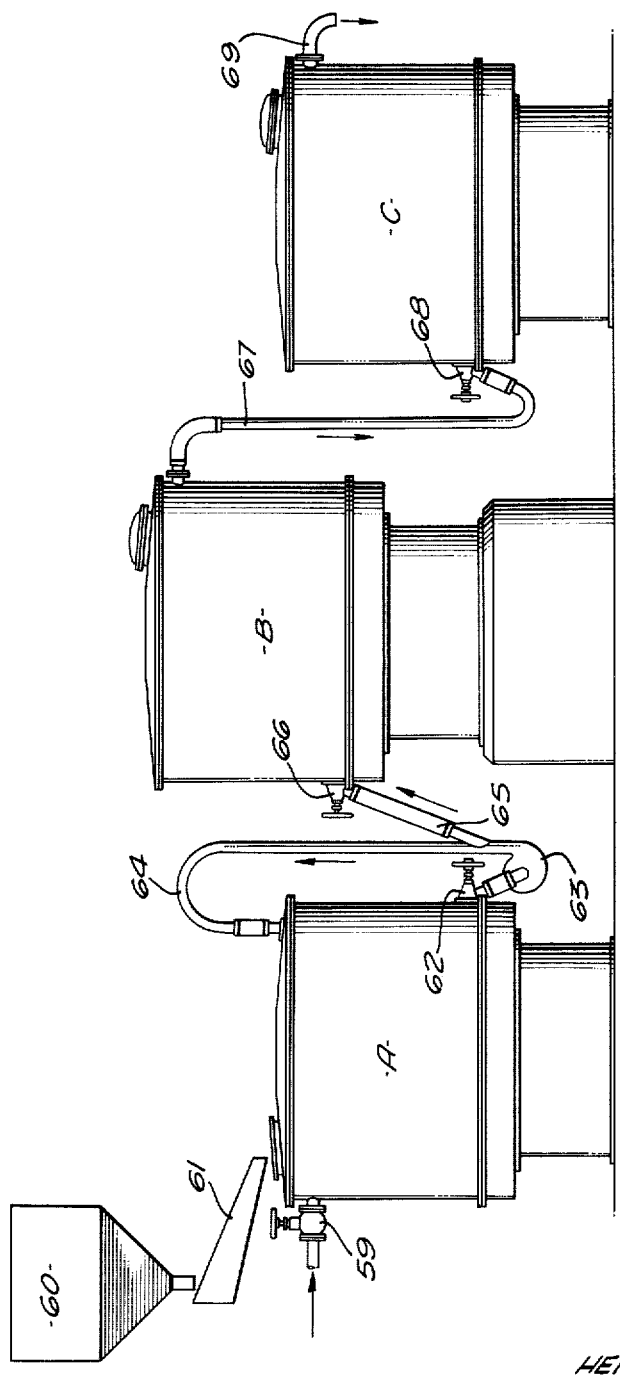
FIGURE 5 is a side elevational view showing a series of three mills to illustrate the manner in which they may be connected to perform certain grinding operations.

Reference is now directed to FIGURE 5 in which is illustrated the manner in which the mill, when employed as a grinding mill, may be arranged in series. In this case, three mills A, B, and C are indicated. The unit A is provided with a water supply valve 59 near its upper end and the initial product is supplied from a hopper 60 and chute 61 into the operating chamber. A valve 62 at the bottom of the chamber discharges a suspension of the initial grind of the product to a pump 63, which may recirculate the product to the top of unit A through a pipe 64, or discharge it through a branch pipe 65 and inlet valve 66 to the bottom of the intermediate unit B. This unit may be elevated so that the intermediate grind of the product may flow by gravity through pipe 67 and inlet valve 68 into the bottom of unit C. The final product overflows from a pipe 69 at the top of unit C. With this arrangement, each unit is designed for the particular size of incoming product; that is, the units A, B and C may operate at increasing speeds, and utilize media of decreasing size or varying shapes.

While particular embodiments of this invention have been shown and described, it is not intended to limit the same to the exact details of the constructions set fourth, and it embraces such changes, modifications, and equivalents of the parts and their formation and arrangement as come within the purview of the appended claims.

What is claimed is:

1. A grinding, deburring and polishing mill or the like, comprising a container adapted to receive material to be ground, a plurality of independent and freely disposed media for grinding, deburring, polishing or burnishing in said container, means resiliently supporting said container, means for imparting high frequency gyratory motion to the container about a substantially vertical axis, the bottom of said container extending spirally upwardly in the direction of gyration so that the gyratory motion will induce material in the container to ascend said bottom, and the upper portion of said bottom terminating at a position above a lower portion of said bottom to provide a step over which the ascending material will cascade, whereby the material and grinding media will be thoroughly mixed.

2. A mill according to claim 1 wherein said container is annular in horizontal cross section to further aid in the transfer of vibrational energy to the grinding media.

3. A grinding, deburring and polishing mill or the like, comprising a container adapted to receive material to be ground, a plurality of independent and freely disposed media for grinding, deburring, polishing or burnishing in said container, means resiliently supporting said container, means for imparting high frequency vibration to the container about a substantially vertical axis, said vibration having a vertical component and a rotational component, the interior of said container being defined by a continuous outer wall and a continuous inner wall spaced therefrom to aid in the transfer of vibrational energy to the grinding media.

4. A grinding, deburring and polishing mill or the like, comprising a container adapted to receive material to be ground, a plurality of independent and freely disposed media for grinding, deburring, polishing or burnishing in said container, means resiliently supporting said container, means for imparting high frequency gyratory motion to the container about a substantially vertical axis, the bottom of said container extending spirally upwardly in the direction of gyration so that the gyratory motion will induce material in the container to ascend said bottom, the upper portion of said bottom terminating at a position above a lower portion of said bottom to provide a step over which the ascending material will cascade whereby the material and grinding media will be thoroughly mixed, the interior of said container being defined by a continuous outer wall and a continuous inner wall spaced therefrom to aid in the transfer of vibrational energy to the grinding media.

5. A grinding, deburring, and polishing mill or the like, comprising:
  (a) an annular container adapted to receive material to be ground, deburred, or polished;
  (b) a plurality of independent and freely disposed media in said container adapted to effect grinding, deburring, or polishing;
  (c) means resiliently supporting said container;
  (d) means for imparting high frequency vibro-gyratory motion to the container about a substantially vertical axis, said vibro-gyratory motion having vertical, radial, and rotational components of a magnitude to effect said grinding, deburring, or polishing of said material, and producing a resultant force to cause mass precession of said material and media around said annular container;
  (e) and an upwardly spiraling bottom for said container to elevate said material and media during precession thereof around said container.

6. A grinding, deburring, and polishing mill or the like, comprising:
  (a) an annular container having vertical radially inner and radially outer annular walls, and an annular bottom curved upwardly at its radially inner and radially outer margins and joined to said annular walls;
  (b) a plurality of independent and freely disposed media for grinding, deburring, polishing or burnishing in said container;
  (c) means for resiliently supporting said container;
  (d) and means for imparting to the walls of said container a high frequency vibro-gyratory movement, whereby said walls forcibly and repeatedly repel said mixture to impart kinetic energy to said mixture of sufficient magnitude to cause grinding, deburring, or polishing of the product.

7. A grinding, deburring, and polishing mill or the like, comprising:
  (a) a container having a central tube forming an inner wall, a concentric outer wall, and an annular bottom wall forming an annular chamber;
  (b) a plurality of independent and freely disposed media for grinding, deburring, polishing or burnishing in said chamber;
  (c) means for resiliently supporting said container;
  (d) an upper eccentric weight within said tube having a peripheral portion contiguous to the walls thereof;
  (e) a lower eccentric weight;
  (f) a shaft concentric with said tube connecting said weights;
  (g) and means for rotating said shaft and eccentric weights thereby to impart to the walls of said chamber a high frequency vibro-gyratory movement, whereby said walls forcibly and repeatedly repel said mixture to impart kinetic energy to said mixture of sufficient magnitude to cause interengagement of said media and product whereby grinding, deburring, or polishing of the product is effected.

8. A machine as set forth in claim 7, wherein:
  (a) said tube extends below said bottom;
  (b) said rotating means is a motor within said tube supported from the walls thereof;
  (c) and said supporting means is a ring of springs disposed under said container.

9. A machine as set forth in claim 7, wherein:
  (a) both of said eccentric weights, said shaft, and said rotating means are located within said tube;
  (b) and said mounting means is a ring of springs surrounding said container and connected thereto above the bottom thereof.

10. A machine as set forth in claim 7, wherein:
  (a) said eccentric weights are relatively positioned to cause mass precession of said media and product;
  (b) and said container includes an upwardly spiraling ramp for elevating said media and product during interengagement and precession of the media and product.

11. A machine as set forth in claim 7 wherein:
  (a) said central tube is vertically disposed;
  (b) and said inner and outer walls having a depth at least equal to the radial distance between said inner and outer annular walls.

References Cited in the file of this patent
UNITED STATES PATENTS

| | | |
|---|---|---|
| 2,284,671 | Meinzer | June 2, 1942 |
| 2,636,719 | O'Connor | Apr. 28, 1953 |
| 2,882,024 | Behrens et al. | Apr. 14, 1959 |
| 2,997,814 | Brandt | Aug. 29, 1961 |

UNITED STATES PATENT OFFICE
CERTIFICATE OF CORRECTION

Patent No. 3,100,088                                            August 6, 1963

Henry Leveson Podmore et al.

It is hereby certified that error appears in the above numbered patent requiring correction and that the said Letters Patent should read as corrected below.

Column 1, before line 11, insert the following paragraph:

This application is a continuation-in-part of application Serial No. 856,100, filed November 30, 1959, now abandoned.

Signed and sealed this 2nd day of February 1965.

(SEAL)
Attest:

ERNEST W. SWIDER                                       EDWARD J. BRENNER
Attesting Officer                                           Commissioner of Patents